May 16, 1967 D. GIGNOUX 3,320,517
BRUSHLESS OBLIQUE FIELD ELECTROSTATIC GENERATOR
Filed May 28, 1963 4 Sheets-Sheet 1

INVENTOR
DOMINIQUE GIGNOUX
BY Semmes and Semmes
ATTORNEYS

May 16, 1967    D. GIGNOUX    3,320,517
BRUSHLESS OBLIQUE FIELD ELECTROSTATIC GENERATOR
Filed May 28, 1963    4 Sheets-Sheet 2
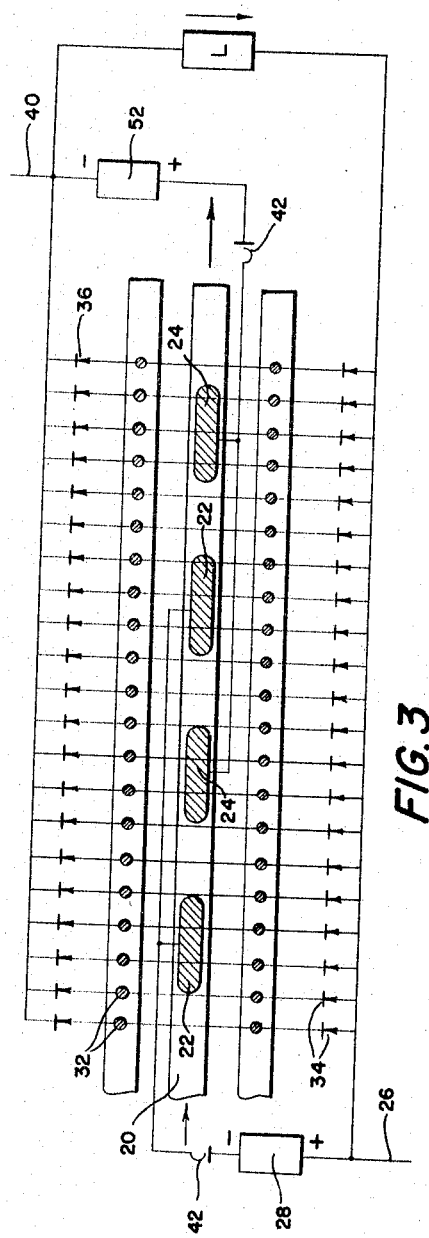
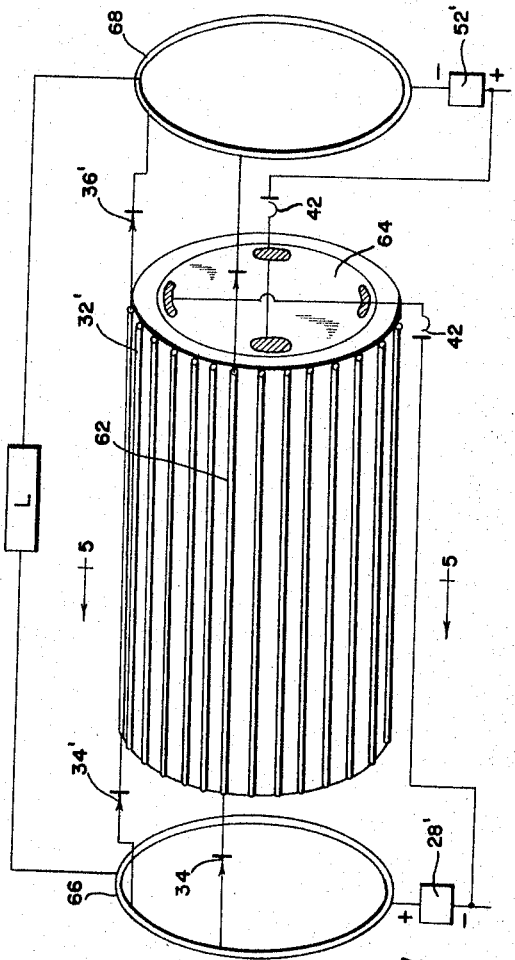
INVENTOR
DOMINIQUE GIGNOUX
BY *Semmes and Semmes*
ATTORNEYS United States Patent Office 3,320,517
Patented May 16, 1967

3,320,517
BRUSHLESS OBLIQUE FIELD ELECTROSTATIC
GENERATOR
Dominique Gignoux, Washington, D.C., assignor to Cosmic, Inc., Washington, D.C., a corporation of Delaware
Filed May 28, 1963, Ser. No. 283,896
3 Claims. (Cl. 322—2)

The present application relates to electrostatic generators particularly a brushless oblique field electrostatic generator which is adapted for use in vacuum conditions.

The present application is a continuation-in-part of applicant's co-pending application Ser. No. 193,261 for Electrostatic Generator, filed May 8, 1962, now U.S. Patent No. 3,173,073.

In the parent application there was employed a generator having at least a pair of stator members with radially embedded inductors supported on opposite sides of a rotor disc having radially embedded charge carriers in greater number than the inductors. Thus, when a charge carrier is adjacent an input inductor, it receives a charge from the input terminal and when it is adjacent the output inductor, it delivers that charge to the output terminal. For this purpose brush members contactable with the charge carriers were mounted adjacent each inductor. However, commutation system employing brushes have not developed satisfactorily for use in vacuum environments. In fact, long life brushes for use in vacuum environments have not been demonstrated as feasible. Consequently, scientific attention is now being given to developing generator designs which have eliminated brushes.

The present invention has as its objective the operation of a constant oblique field electrostatic machine without a commutator. Features described in the parent application, such as semi-conducting stator and charge carriers embedded in an insulating material, are still applicable. As advanced in applicant's study entitled, "Electrostatic Generators in Space Power Systems" (Progress in Astronautics and Rocketry, vol. 3, Academic Press, 1961), no energy is produced on the faces of a rotor segment which is parallel to the stator. The best type of generator, therefore, would be one in which not only those surfaces perpendicular to the direction of motion but those parallel to the direction of motion are subjected to an active force. This requires that the field be oblique and not perpendicular to the surface. This obliquity can only be achieved if the rotor or stator surface or both are made of a nonconducting material. In previous generators only a minute portion of the rotor surface is the subject of active forces. In the present invention most of the rotor surface is utilized in the production of electrical energy. A much lighter power to weight ratio can therefore be obtained which is advantageous particularly for power systems usable in outer space. The present invention, therefore, is addressed to the employment of rotor charge carriers which are diminutive in size, yet maintain maximum constant oblique field. Maximum constant oblique field in the "stator gaps" or area between rotor and stator elements is achieved because at any one time there is a plurality of charge carriers intermediate the inductor elements, as in the parent application. This constant oblique field effect is distinguished from the limited obliquity which is achievable only on the leading and trailing edges of conventional rotor elements. Nevertheless, a simplification is obtained in a preferred construction by rotating the part, which in the parent application was called the "stator," and keeping stationary the part, which in the parent application was called the "rotor." Thus, a plurality of stator discs having radially embedded charge carriers or bars are "stacked" or supported alternately with respect to a plurality of rotor discs having radially embedded inductors. High voltage excitation sources may be connected to these inductors at input and output terminals. The individual charge carriers are connected by rectifiers from the input terminal to the output terminal, the rectifiers being oriented so that the flow of current is from the input terminal to the output terminal via the charge carriers, and then flows through the load to return to the input terminal.

Accordingly, it is an object of invention to provide an electrostatic machine wherein commutation is eliminated.

Another object of invention is to provide an electrostatic generator adapted for high power operation in vacuum conditions.

Another object of invention is to provide a simplified wiring construction for electrostatic generators employing a plurality of stators and rotors.

Yet, additional objects of invention will become apparent from the ensuing specification and attached drawings wherein:

FIG. 1 is an exploded perspective of a preferred construction wherein a plurality of rotor discs having radially embedded inductors 22 and 24 are mounted upon a rotatable shaft about which are fitted stator members having radially embedded charge carriers 32.

FIG. 3 is a fragmentary top plan schematic view showing the circuitry intermediate the individual charge carrier members, the inductors and the high voltage excitation sources.

FIG. 4 is a front elevation of a modified construction wherein the rotor and stator are of cylindrical construction.

Figure 2:
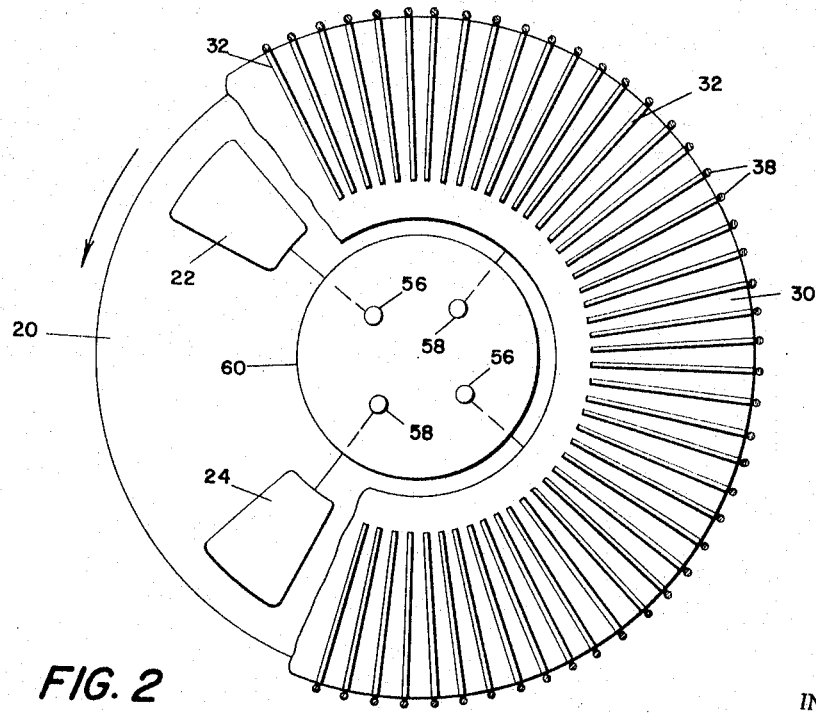
FIG. 2 is a front elevation, partially in section showing a stator with radially extending charge carriers positioned adjacent a rotor having embedded inductors.

FIGURES 2 and 3 illustrate the principle of operation. Rotor 20 has radially embedded input inductors 22 and output inductors 24, which move in the direction of the arrow. Input inductor 22 is maintained at a high potential with respect to input terminal 26 by means of auxiliary high voltage generator 28. Each charge carrier or bar 32 is connected to input terminal 26 by means of a rectifier 34 and to output terminal 40 by means of a rectifier 36. When the bar 32 is in close relation to inductor 22, a current flows from the input terminal 26 to bar 32. When the same bar 32 is in close relation to output inductor 24 a current flows from the bar to output terminal 40. Inductors 22 and 24 are kept at their desired potentials by connections to the terminals of the auxiliary generators or high voltage excitation sources 28 and 52. Such connections can be made by use of a slip ring 42. No current other than that needed to compensate for losses is required by the inductors. Therefore, inductors 22 and 24 may be maintained at the desired potentials by means of radioactive batteries, in which case, no actual contact would be necessary.

Figure 1:
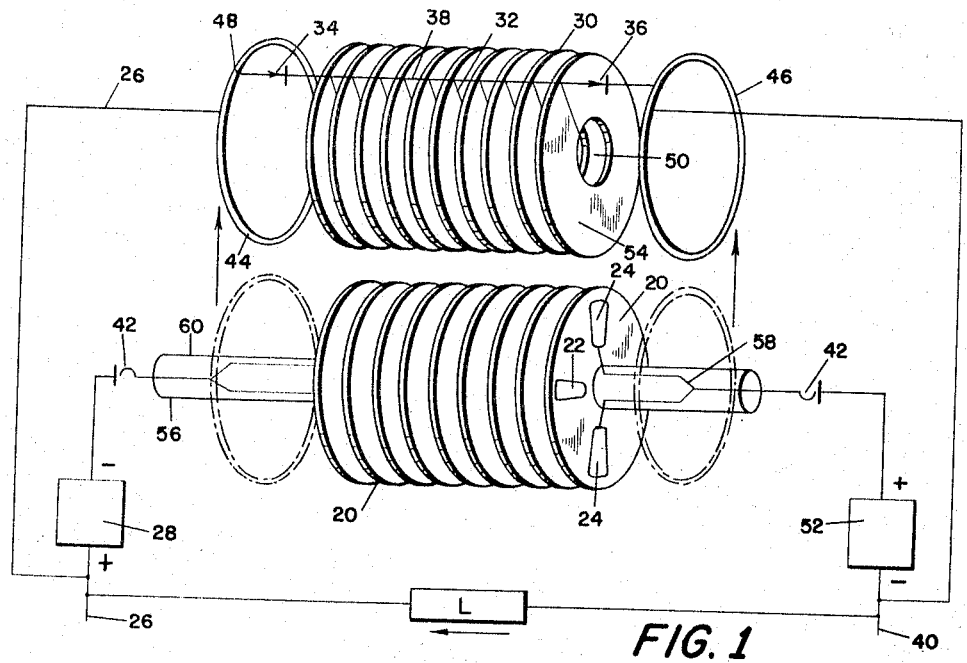

FIGURE 1 is an exploded perspective showing one particular embodiment of the invention. At the top is stator 54, consisting of insulated discs 30 cored so as to present axial apertures 50 and having radially embedded charge carriers 32. For purposes of illustration, the series of charge carriers 32 in the same angular position only are shown. Beneath is rotor 20 shown as consisting of a plurality of plates each having four poles, two input inductors 22 and two output inductors 24. FIG. 2 is a cross-sectional view showing a single rotor element 20 as positioned adjacent a single stator element 30. For the same reasons stated in the parent application, it is desirable to have inductors 22 and 24 embedded in a semi-conducting dielectric material. The advantages of the semi-conducting dielectric material is explained in the parent case. Thus, the semi-conducting material is used in order to limit variations of the tangential field and to stop arc discharges which might start. The use of the semiconducting material between input and output inductors insures a regular distribution of voltage and, therefore, of the tangential field, preventing breakdown. It is also useful in limiting the parisitic normal field due to rapid variations of the tangential field.

The semi-conductive may be glass, with added impurities, and its resistivity is kept such that the current drain will be only a very small part of the output current, for example, on the order of $10''$ ohms-cm./cm.$^2$. A very interesting feature of the constant oblique field design is that most of the surface materials subjected to high electrical fields are insulating materials. For example, the field between rotor and stator will not exert an action directly on any metallic members, but only on an insulating surface. Although the technical literature does not provide data on the exact dielectric strength of a gap between insulating and semiconducting materials, the inventor has found that the use of such materials brings a direct and substantial improvement in dielectric strength of the gaps, and thereby in generator performance. The connections to the inductors in this particular embodiment are made by axial rods 56 and 58 embedded within insulated shaft 60.

In the FIGURE 1 arrangement nine rotor disks 20 and ten stators 30 are "stacked." All the stator bars or charge carriers 32, which are in the same angular position, are connected by an axial rod 38 which interconnects rectifiers 34 and 36. The input terminal 26 and output terminal 40 are connected to the other ends of these rectifiers by wire ring termini 48 and 46. The input inductors 22 are all connected by axial conducting rods 65 disposed within the shaft 60 to the input auxiliary excitation generator 28. Similarly, all output inductors 24 are connected by means of axial rods 58 embedded within the shaft 60 to output high voltage excitation power supply 52. For simplicity's sake FIG. 1 shows the rotor and stator as two separate elements. In the actual construction, however, the rotor and stator are built simultaneously and stacked so that the stator and rotor disks are alternately supported with respect to one another. This arrangement appears to be of particular value in high powered electrostatic generators having a number of stators and rotors since the addition of the rectifier does not become too taxing as far as weight and construction are concerned.

Figure 5:
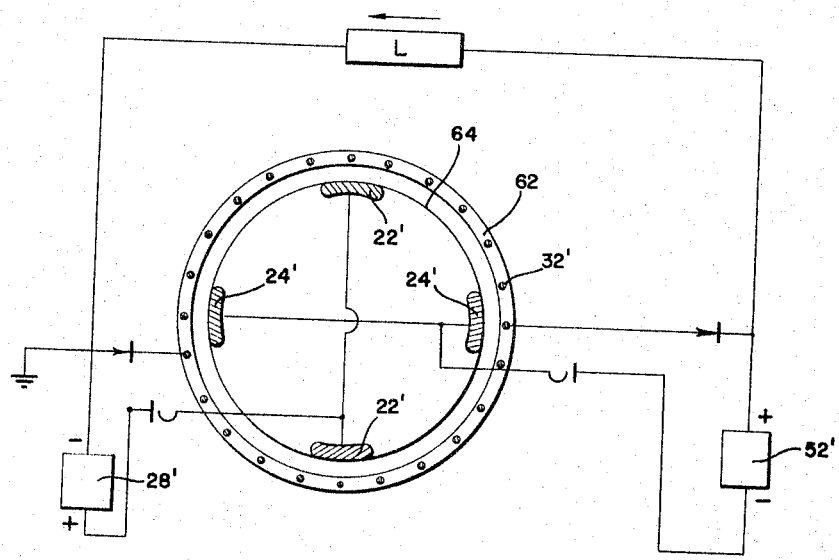
FIG. 5 is a vertical section taken along section line 5—5 of FIG. 4.

In FIGS. 4 and 5 a modified cylindrical stator 62 having longitudinally extending charge carrier bars 32' is shown positioned outwardly of a cylindrical rotor 64 having longitudinally positioned inductors 22' and 24' positioned in its walls. According to this modification of invention, rectifiers 34' and 36' may be positioned at the ends of longitudinal bars 32' and direct contact input ring 66 and output ring 68 may remain stationary. The current then flows through the load from the output ring 68 to input ring 66.

Figure 6:
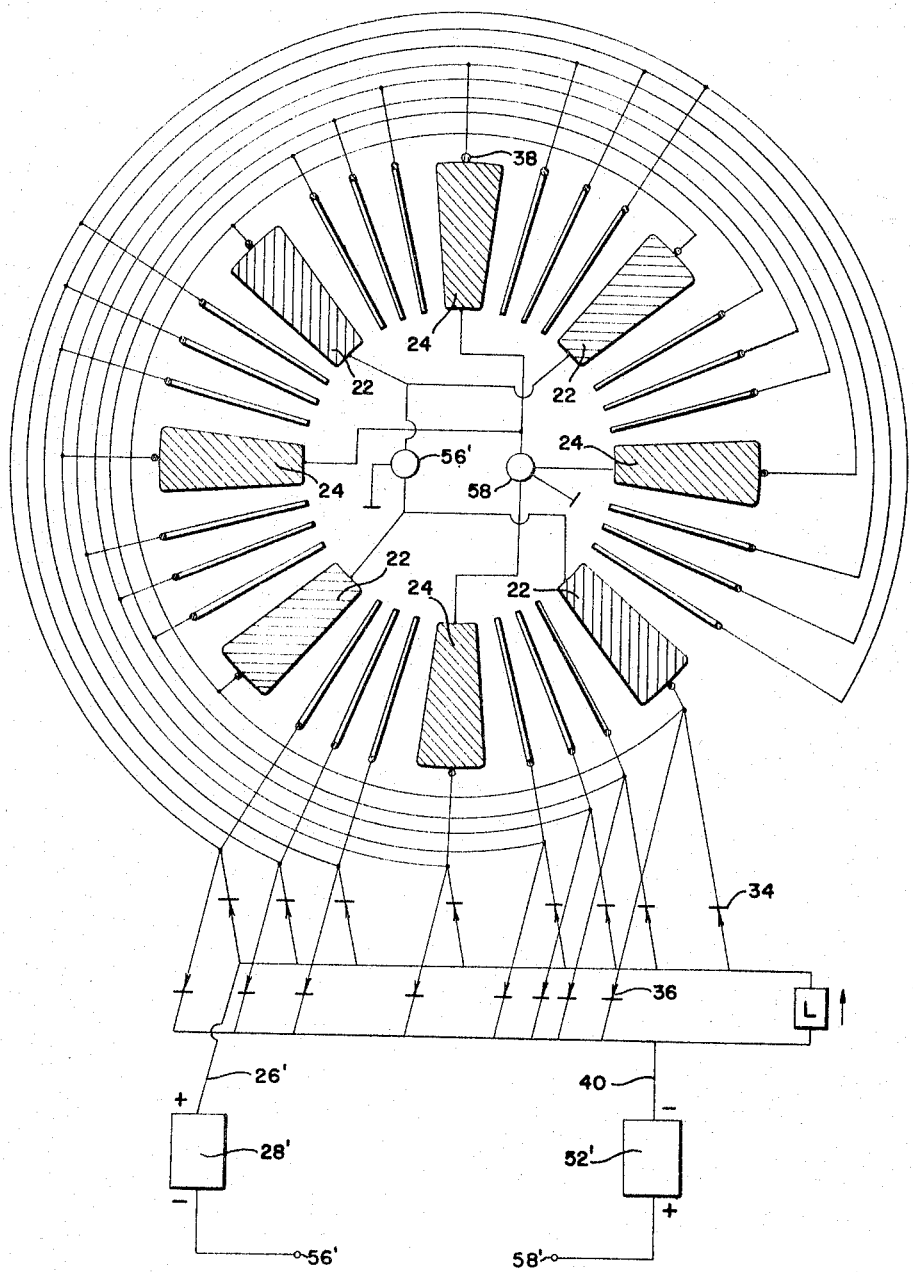
FIG. 6 is a front elevation schematic of a modified circuit wherein homologue or in-phase charge carriers are wired in parallel to eliminate the number of rectifiers required.

In a generator using $n$ charge carriers and $p$ pairs of poles, one pair of poles consisting of one input and one output inductor disposed consecutively, it is possible to choose $n$, a multiple of $p$, in which case the number of rectifiers instead of being $2n$ may be reduced to $2n/p$. This can be accomplished by grouping the bars 32 occupying the same in phase or homologue position with respect to the input or output inductors at the same time. Such possibility is illustrated in FIG. 6.

Figure 7:
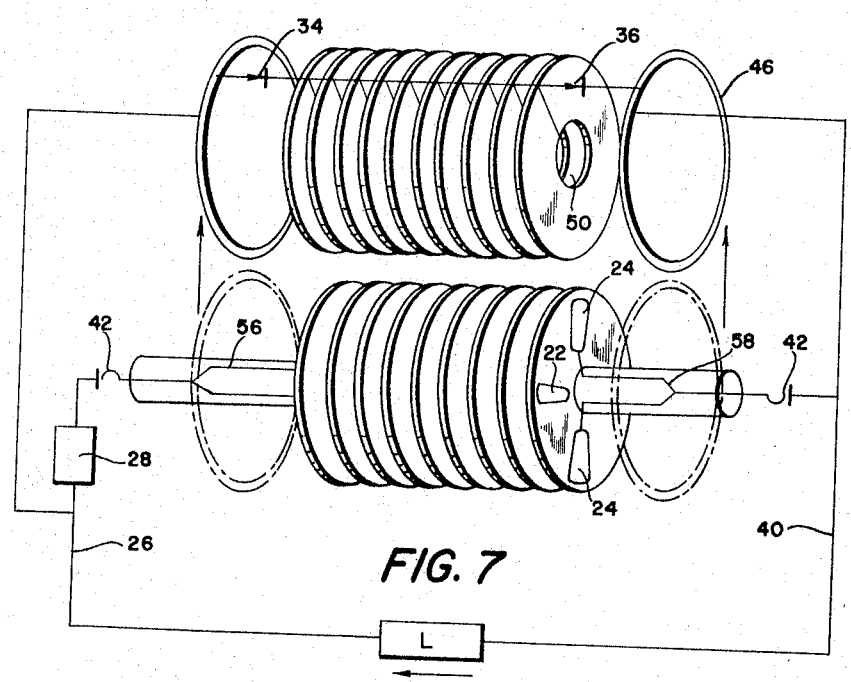
FIG. 7 is a perspective of a proposed apparatus as in FIGS. 1–3, only a single high voltage excitation source being employed.

It is possible also to use only one auxiliary excitation power supply. For reasons of convenience one often uses only a single input auxiliary power supply 28, as illustrated in FIG. 7. Manifestly, changes in construction of stator and rotor elements, as well as changes in circuitry may be employed without departing from the spirit and scope of invention, as defined in the sub-joined claims.

I claim:
1. An oblique field electrostatic generator of the type having input and output terminals and comprising:
    (A) high voltage excitation sources connected to said terminals;
    (B) a plurality of coaxially aligned rotor discs of semi-conducting material with input and output inductors radially embedded therein;
    (C) an insulating shaft extending axially through said rotor discs and having longitudinal rods therein for closing contacts respectively between said inductors and said high voltage excitation sources;
    (D) a plurality of cored stator discs of insulating material, each stator disc having rod-like charge carrier members radially embedded therein in greater number than said inductors and each stator disc being supported alternately with said rotors about said insulating shaft; said charge carriers embedded in the same angular position in each said stator disc being mounted in parallel and collectively connected via axial rod means, whereby a field which is oblique to said rotor and stator surfaces is achieved over a substantial portion of the area intermediate said rotor and stator;
    (E) means revolving said shaft and thus said rotor discs relatively to said stator; and
    (F) rectifier means connecting each of said charge carrier members from said input terminal and to said output terminal so that the flow of current is from said input terminal to said output terminal via said charge carriers.

2. Electrostatic generator as in claim 1, wherein said axial rods connecting said rotor charge carrier members are positioned opposite the outward extremity of said charge carrier members and perpendicularly of the periphery of said stator discs.

3. An oblique field electrostatic generator of the type having input and output terminals and comprising:
    (A) a high voltage excitation source connected to said terminals;
    (B) a cylindrical stator of insulating material having a plurality of longitudinally extending charge carriers embedded in its walls;
    (C) a rotor cylinder of semi-conducting di-electric material, being coaxially aligned and positioned within said cylindrical stator, and having input and output inductors longitudinally embedded therein said inductors being substantially less in number than said charge carriers, whereby a field which is oblique to said rotor and stator surfaces is achieved over a substantial portion of the area intermediate said rotor and stator;
    (D) rectifier means connecting each of said charge carrier members from said input terminal and to said output terminal so that flow of current is from the input terminal to the output terminal via the charge carriers;
    (E) means connecting said input inductors and said output inductors respectively to said input and output terminals; and
    (F) means rotating said rotor cylinder and thus said inductors relatively to said charge carriers.

(References on following page)

References Cited by the Examiner

UNITED STATES PATENTS

| | | | |
|---|---|---|---|
| 2,519,554 | 8/1950 | Telici | 310—6 |
| 2,522,106 | 9/1950 | Telici | 310—6 |
| 2,542,494 | 2/1951 | Telici | 310—6 |
| 2,739,248 | 3/1956 | Meier | 310—6 |
| 3,039,011 | 6/1962 | Gale | 310—6 |
| 3,094,653 | 6/1963 | Le May et al. | |
| 3,143,671 | 8/1964 | Gale | 310—6 |
| 3,192,414 | 6/1965 | Reusser | 310—6 |
| 3,210,643 | 10/1965 | Else et al. | 310—6 |

MILTON O. HIRSHFIELD, *Primary Examiner.*

J. J. SWARTZ, *Assistant Examiner.*